United States Patent
Challener et al.

(10) Patent No.: US 7,480,214 B2
(45) Date of Patent: Jan. 20, 2009

(54) EFFICIENT WAVEGUIDE COUPLER FOR DATA RECORDING TRANSDUCER

(75) Inventors: William Albert Challener, Sewickley, PA (US); Tim Rausch, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 589 days.

(21) Appl. No.: 10/730,557

(22) Filed: Dec. 8, 2003

(65) Prior Publication Data
US 2005/0122850 A1 Jun. 9, 2005

(51) Int. Cl.
*G11B 11/00* (2006.01)

(52) U.S. Cl. .................................. 369/13.24
(58) Field of Classification Search .................. None
See application file for complete search history.

(56) References Cited

U.S. PATENT DOCUMENTS

| | | | |
|---|---|---|---|
| 5,930,434 A | 7/1999 | Mowry et al. | |
| 6,253,003 B1 | 6/2001 | Nakamura | |
| 6,282,345 B1 | 8/2001 | Schimpe | |
| 6,744,951 B2 * | 6/2004 | Dawes et al. | 385/50 |
| 6,937,799 B2 * | 8/2005 | Matsushima et al. | 385/50 |
| 2002/0039469 A1 * | 4/2002 | Jeong et al. | 385/43 |
| 2003/0048992 A1 | 3/2003 | Lundqvist | |
| 2003/0053756 A1 | 3/2003 | Lam et al. | |
| 2003/0198146 A1 * | 10/2003 | Rottmayer et al. | 369/13.13 |
| 2006/0204175 A1 * | 9/2006 | Laurent-Lund et al. | 385/43 |

* cited by examiner

*Primary Examiner*—Joseph Feild
*Assistant Examiner*—Tawfik Goma
(74) *Attorney, Agent, or Firm*—Westman, Champlin & Kelly, P.A.

(57) ABSTRACT

A data recording head having at least two waveguides that are energy-coupled. The first waveguide is end fire coupled to a radiant energy source of a first spot size, and the second waveguide outputs radiant energy of a second spot size onto a recording medium. The width of the first waveguide is larger than the width of the second waveguide, or the first spot size is larger than the second spot size. The recording also includes a cladding layer and/or a diffraction grating for mode index matching between the first and second waveguides. The second waveguide includes a solid immersion optical element to focus the output radiant energy. In one embodiment, the data recording head includes a write element to effect magnetic data recording, and the first and second waveguides are configured relative to the write element and supported relative to the recording medium to effect heat assisted magnetic recording.

19 Claims, 3 Drawing Sheets

EFFICIENT WAVEGUIDE COUPLER FOR DATA RECORDING TRANSDUCER

This invention was made with United States Government support under Agreement No. 70NANB1H3056 awarded by the National Institute of Standards and Technology (NIST). The United States Government has certain rights in the invention.

FIELD OF THE INVENTION

The present invention relates to data recording transducers, and particularly to magnetic recording heads, and more particularly to magnetic recording heads for use in heat assisted magnetic recording systems and processes.

BACKGROUND OF THE INVENTION

There are many different forms of data recording. For example, magnetic data recording is one of the prevailing forms of data recording. Magnetic data recording may be implemented using different types of magnetic recording media, including tapes, hard discs, floppy discs, etc. Over the years, significant developments have been made to increase the areal data recording density in magnetic data recording.

Superparamagnetism is a major limiting factor to increasing magnetic recording areal density. Superparamagnetism results from thermal excitations perturbing the magnetization of grains in a ferromagnetic material, making the magnetization unstable. As the magnetic media grain size is reduced for high areal density recording, superparamagnetic instabilities become more of an issue. The superparamagnetic effect is most evident when the grain volume V is sufficiently small that the inequality $K_u V/k_B T > 40$ can no longer be maintained. $K_u$ is the material's magnetic crystalline anisotropy energy density, $k_B$ is the Boltzmann's constant, and T is absolute temperature. When this inequality is not satisfied, thermal energy demagnetizes the individual grains and the stored data bits will not be stable. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, the available recording heads are not able to provide a sufficient or high enough magnetic writing field to write on such a medium. Heat Assisted Magnetic Recording (HAMR), sometimes referred to as optical or thermal assisted recording, has been proposed to overcome at least some of the problems associated with the superparamagnetic effect. HAMR generally refers to the concept of locally heating a recording medium with a laser to reduce the coercivity of the recording medium, so that an applied magnetic writing field can more easily direct the magnetization of the recording medium during the temporary magnetic softening of the recording medium caused by the laser. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information.

Current proposed HAMR head designs, which integrate a waveguide for facilitating coupling the light from the laser onto the recording medium, have a number of shortcomings. Some of the current head designs inefficiently couple the light from the laser. In some instances, a waveguide configuration with a size that is suitable for HAMR head is not suitable for efficient coupling of light from the laser. Some HAMR head designs require that the slider, which supports the head, have a sufficiently large back surface area in order to accommodate coupling of the light from the laser, which competes for space with the bonding pads of the slider. In addition, some of these head designs are difficult to fabricate.

Accordingly, there is a need for a HAMR head design that allows for efficient coupling of radiant energy into a waveguide, and that does not require large surface area of the slider. In addition, there is a need for a HAMR head design having a coupling to radiant energy, which does not substantially compete with the bonding pads for the back surface area of the slider. Furthermore, there is a need for a HAMR head design that lends itself for ease in manufacturing.

SUMMARY OF THE INVENTION

The present invention is directed to a novel data recording head having at least two energy-coupled waveguides, and a data storage system incorporating the same. In a particular embodiment, the data recording head is of the type designed and structured for magnetic data recording in magnetic disc storage systems.

In one aspect of the present invention, the first waveguide is configured to efficiently end fire couple radiant energy of a first spot size from an external radiant energy source, and the second waveguide is configured to output radiant energy of a desired second spot size onto the recording medium.

In another aspect of the present invention, the width of the first waveguide is larger than the width of the second waveguide, or the first spot size is larger than the second spot size.

In a further aspect of the present invention, the recording head includes a coupling layer between the first and second waveguides for facilitating optical energy-coupling between the waveguides. In one embodiment, the recording head includes a cladding layer. In another embodiment, the recording head includes a diffraction grating between the first and second waveguides.

In yet another aspect of the present invention, a solid immersion optical element is provided in the second waveguide to focus the output radiant energy.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

The present invention is directed to a data recording head for a data recording system, which includes at least two waveguides. A recording head, as used herein, is generally defined as a head capable of performing read and/or write operations. By way of illustration and not limitation, the present invention will be described in connection with a magnetic data recording head and system, and in particular a HAMR head and system.

In accordance with the present invention, the HAMR head includes at least two waveguides for efficiently coupling radiant energy between from a source. The waveguide configuration of the present invention is particularly suited for end fire coupling of the radiant energy to one of the waveguides on the HAMR head. End fire coupling is a term often used to refer to the incident of radiant energy directly to an exposed end of a waveguide.

Figure 1:
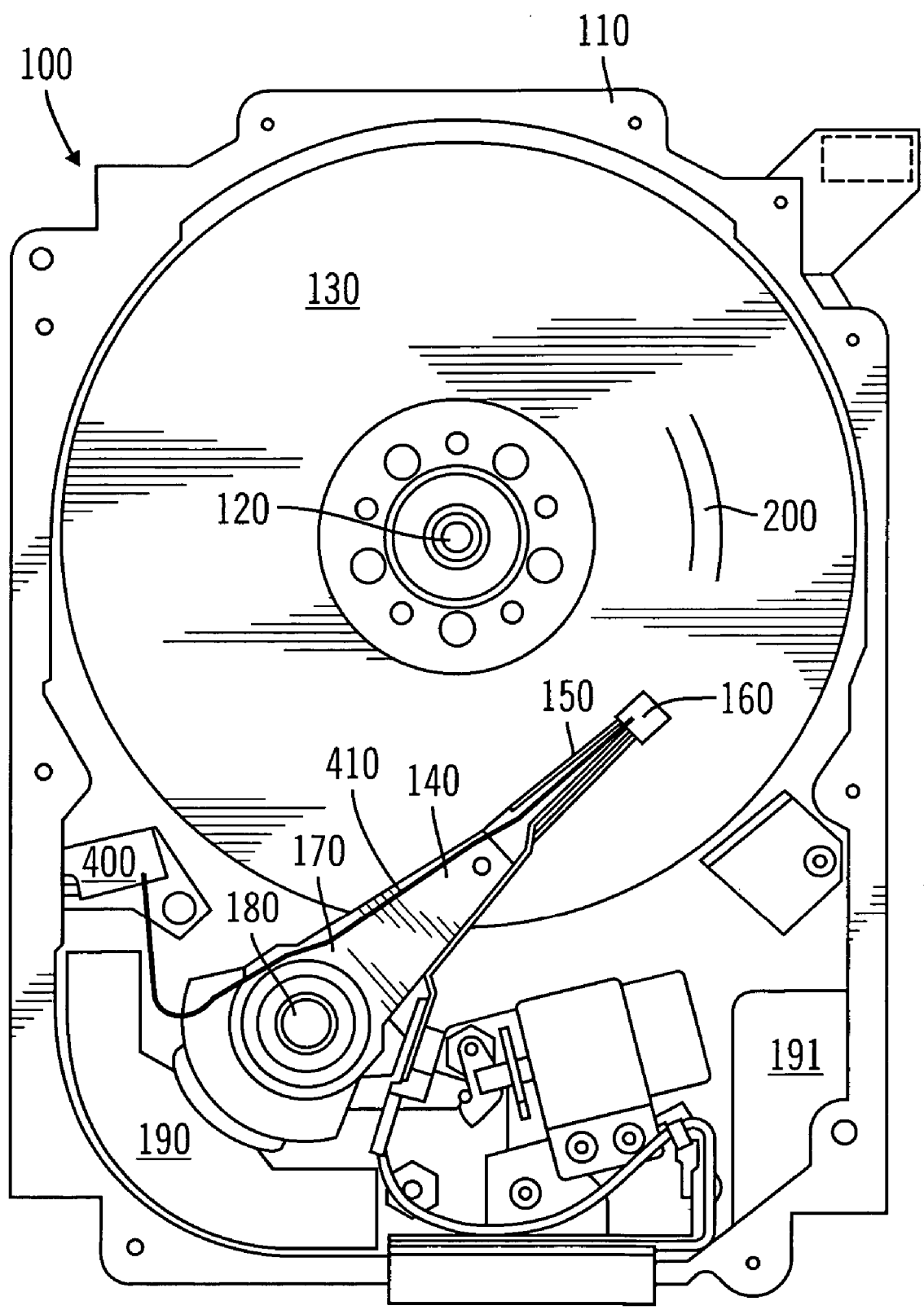
FIG. 1 is a pictorial representation of a disc drive incorporating the inventive magnetic recording head in accordance with one embodiment of the present invention.

FIG. 1 is a pictorial representation of a disc drive 100 that incorporates the inventive magnetic recording head. The disc drive 100 includes a housing 110 (with the upper portion removed and the lower portion visible in this view) sized and configured to contain the various components of the disc drive 100. The disc drive 100 includes a spindle motor 120 for rotating at least one perpendicular magnetic storage medium 130 within the housing 110. At least one arm 140 is contained within the housing 110, with the arm 140 having a first end 150 with a perpendicular recording head or slider 160, and a second end 170 pivotally mounted on a shaft by a bearing 180. An actuator motor 190 is located at the arm's second end 170 for pivoting the arm 140 to position the recording head 160 over a desired sector or track 200 of the disc 130. The actuator motor 190 is regulated by a controller 191.

Figure 2:
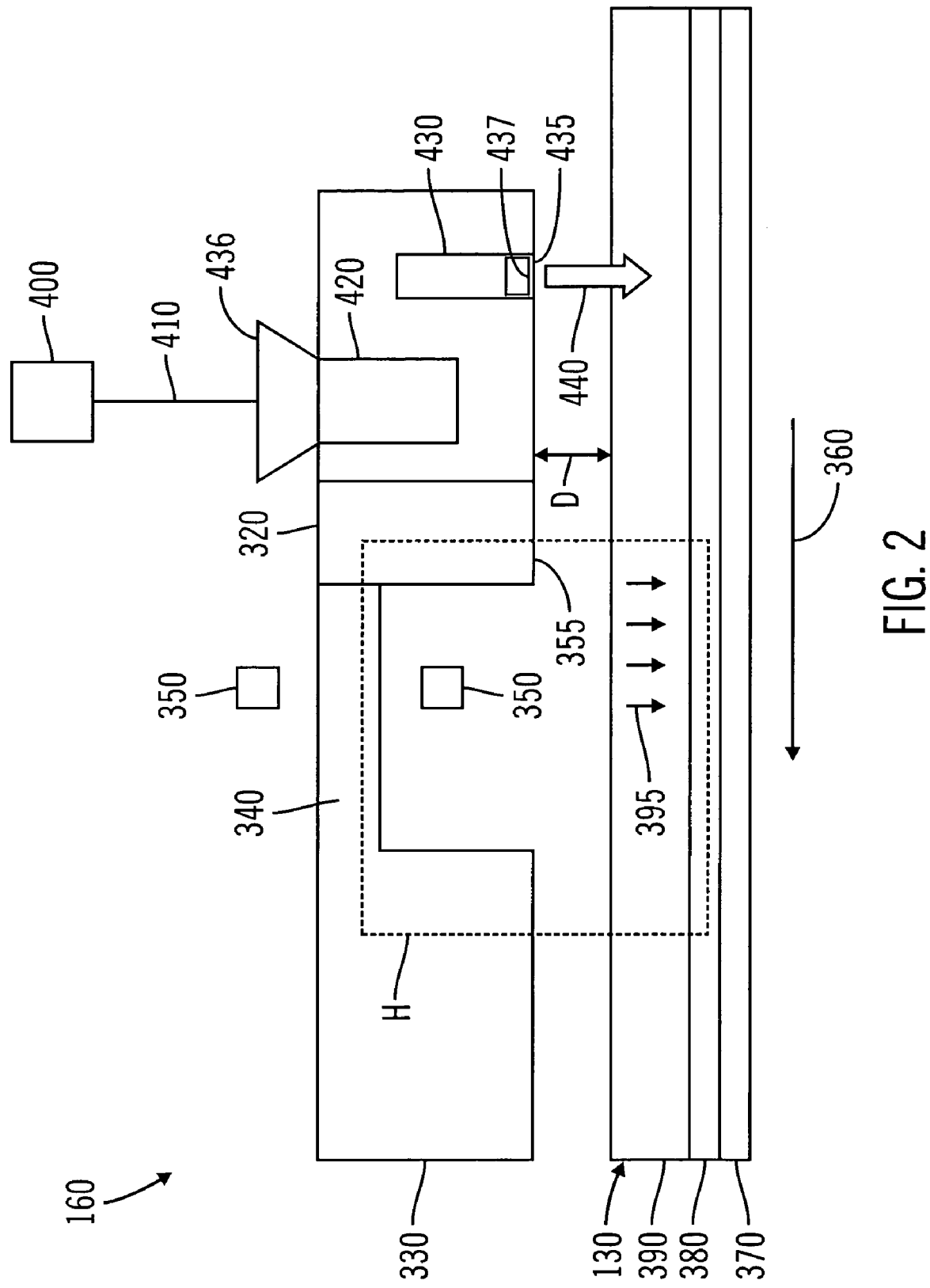
FIG. 2 is a partial schematic side view of a perpendicular magnetic recording head in accordance with one embodiment of the present invention.

FIG. 2 is a partially schematic side view of the perpendicular magnetic recording head 160 in accordance with one embodiment of the present invention. FIG. 2 also shows the magnetic recording medium 130 that is suitable for perpendicular magnetic recording. Perpendicular magnetic recording, as used herein, generally refers to orienting magnetic domains within a magnetic storage medium substantially perpendicular to the direction of travel of the recording head and/or recording medium.

Although one embodiment of the invention is described herein with reference to perpendicular magnetic recording, it will be appreciated that aspects of the invention may also be used in conjunction with other types of recording (e.g., longitudinal) where it may be desirable to employ heat assisted magnetic recording.

The recording head 160 includes a writer section including a write element, such as a write pole 320 and a return or opposing pole 330 that are magnetically coupled by a yoke or pedestal 340. It will be appreciated that the recording head 160 can include only the write pole 320 and no return pole 330 or yoke 340. A magnetization coil 350 surrounds the yoke 340 for energizing the recording head 160. The recording head 160 can also include a read head (not shown), which may be any conventional type read head as is generally known in the art. An air bearing surface 355 separates the recording head 160 from the medium 130 by a distance D.

The perpendicular magnetic recording medium 130 is positioned adjacent to or under the recording head 160 and travels in the direction of arrow 360. The recording medium 160 includes a substrate 370, which may be made of any suitable material such as ceramic glass or amorphous glass. A soft magnetic underlayer 380 is deposited on the substrate 370. The soft magnetic underlayer 380 may be made of any suitable material such as, for example, alloys or multilayers having Co, Fe, Ni, Pd, Pt or Ru. A hard magnetic recording layer 390 is deposited on the soft underlayer 380, with perpendicularly oriented magnetic domains 395 contained in the hard layer 390. Suitable hard magnetic materials for the hard magnetic recording layer 390 may include at least one material selected from, for example, FePt or CoCrPt alloys having a relatively high magnetic anisotropy at ambient temperature.

The write pole 320 has a relatively high saturation magnetic moment, thereby resulting in a strong magnetic write field H. The strong magnetic write field H permits use of the recording medium 130 having a relatively high coercivity or anisotropy, thereby limiting superparamagnetic instabilities even at high recording densities.

The disc drive 100 includes a source of radiant energy 400 and an optical fiber 410. The source 400 provides for the generation of surface plasmons or guided modes that travel toward a heat emission surface 435 that is formed along the air-bearing surface 355 thereof. The source 400 may be, for example, a laser diode, or other suitable lasers or coherent light source with sufficient radiant energy. The radiant energy can be in the form of, for example, visible light, infrared light, or other visible or invisible light in other frequency or wavelength spectrums. The optical fiber 410 facilitates transmission of the radiant energy from the source 400 to the recording head 160. The source 400 may be located within or external to the housing 110. The optical fiber 410 may be routed from the source 400 along the suspension arm 140 to the recording head 160. While source 400 is illustrated in FIG. 2 to be separate from the head 160, it may be made a part of the head 160. For example, a solid state laser may be fabricated as an integral part of the head 160, or a part that is attached to the head 160, in a manner to provide optical coupling of the radiant energy to the first waveguide 420 described below.

Figure 3:
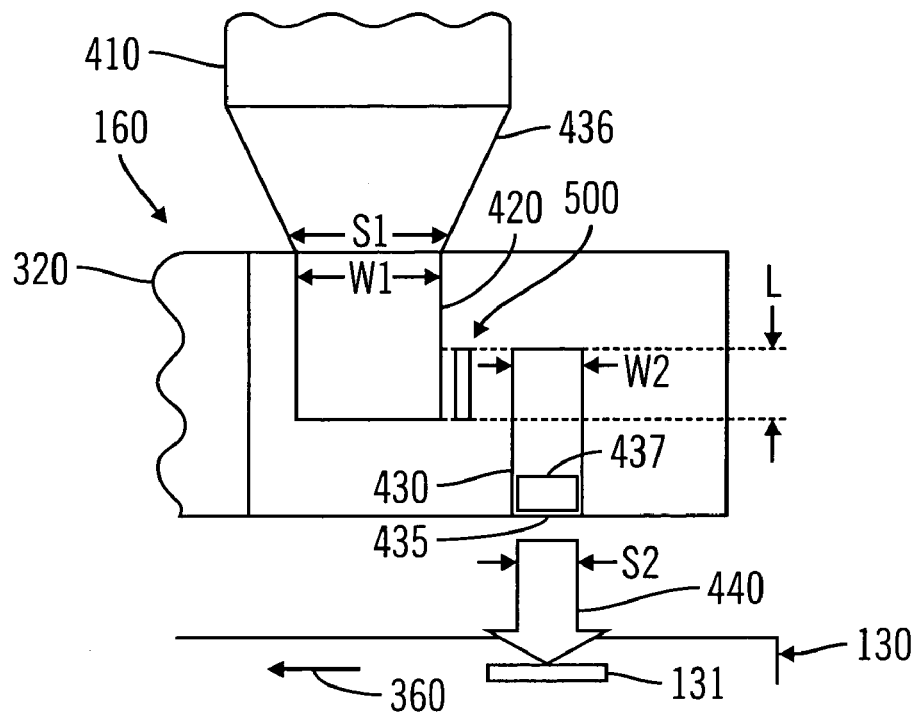
FIG. 3 is a partial schematic side view of the first and second waveguides in the head.

The recording head 160 includes first and second waveguides 420 and 430. FIG. 3 is a schematic view of the first and second waveguides 420 and 430. The first waveguide 420 facilitates coupling radiant energy from the optical fiber 410, and therefore from the source 400. More specifically, the first waveguide 420 is optically coupled with the optical fiber 410, which facilitates transmission of radiant energy from the source 400 to the first waveguide 420. The radiant energy (designated by reference number 436) from the optical fiber 410 and incident on the first waveguide 420 has a spot size S1. The first and second waveguides 420 and 430 may be planar waveguides. The first waveguide 420 has a functional or characteristic width or thickness W1 and a first refractive index n1. The width W1 is sized such that the first waveguide 420 can efficiently end fire couple the radiant energy 436 from the optical fiber 410, in which the width W1 is about the size of the spot size S1. The first waveguide 420 can be formed of a material that is a non-conductive dielectric and having extremely low optical absorption (high transmissivity). For example, the material can include a silica-based material, such as $SiO_x$.

The second waveguide 430 facilitates focusing the radiant energy to a desired spot size onto the recording medium 130. The second waveguide 430 is optically coupled with the first waveguide 420. The second waveguide 430 has a functional or characteristic width W2 and a refractive index n2. The width W2 is sized such that radiant energy (generally designated by reference number 440) emerging from the second waveguide 430 is focused to a desired spot size S2. The width W2 can be different from the width W1, and that is typically the case, given that the output spot size of the second waveguide 430 is significantly smaller than the input spot size to the first waveguide 420. The width W1 may be five times larger than the width W2. For example, the width W2 may be on the order of 100-150 nm, and the width W1 may be on the order of 500-1000 nm. The second waveguide 430 can be formed of a material that is a non-conductive dielectric and having extremely low optical absorption (high transmissivity). For example, the material can include $Ta_2O_5$.

The first and second waveguides 420 and 430 overlap each other by an interactive length L. The interactive length L is chosen such that there is optimal optical coupling of the radiant energy between the first and second waveguides 420 and 430. The length L may be on the order of 50-100 nm for the range of values of width W1 and width W2 mentioned above.

The recording head 160 can include a cladding layer 500 between the first and second waveguides 420 and 430. The cladding layer 500 is formed of a material, such as $SiO_2$, having a refractive index n3, which is less than n1 and n2. The refractive index n3 of the cladding layer 500 is chosen such that the cladding layer 500 minimizes radiant energy leakage out of the first and second waveguides 420 and 430. The cladding layer 500 may have a width (or thickness) on the order of several nm to 5000 nm. The width of the cladding layer also affects the energy coupling efficiency between the two waveguides 420 and 430.

The cladding layer 500 is used for matching the mode indices of the waveguides. In addition to choosing the appropriate interactive length L, optical coupling can be optimized between the first and second waveguides by matching mode indices of the first and second waveguides 420 and 430. If the width W1 of the first waveguide 420 is wider than the width W2 of the second waveguide 430, mode index matching could occur if the refractive index n1 of the first waveguide 420 is smaller than the refractive index n2 of the second waveguide 430. For example, a 500 nm wide $SiO_x$ first waveguide with a refractive index n1=1.756 surrounded by a $SiO_2$ cladding (n3=1.48) has a mode index of 1.700. Likewise, a 100 nm wide $Ta_2O_5$ second waveguide with a refractive index n2=2.09 surrounded by the $SiO_2$ cladding has a mode index of 1.700.

Generally, as noted above, the coupling between the waveguides 420 and 430 could be optimized for efficient energy transfer by selecting an optimum configuration based on such parameters including interactive length L, and the width and index of the cladding layer 500. The exact width of the cladding layer 500 could be determined by experimenting with the parameters. In view of the relatively strong coupling effect of the relatively thin cladding layer 500 (width on the order of 50-100 nm), it would be a challenge to try to determine the optimal width using analytical modeling, because of problems inherent with analytical modeling of a strong coupling configuration.

Figure 4:
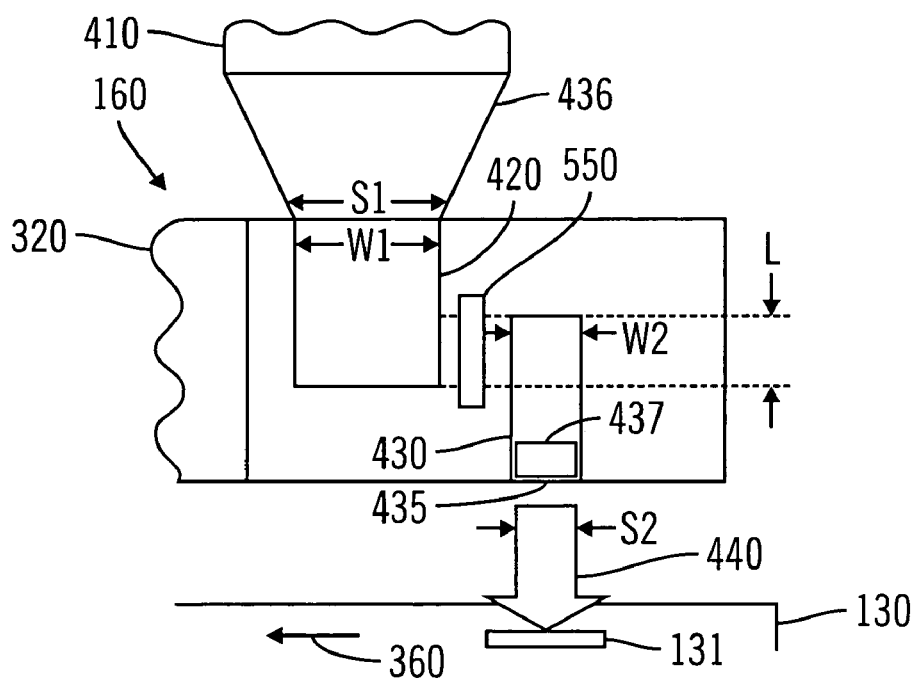
FIG. 4 is a partial schematic side view of the recording head in accordance with another embodiment of the present invention.

FIG. 4 is a partial schematic view of the recording head 160 in accordance with another embodiment of the present invention. The recording head 160 can include a diffraction grating 550 in lieu of the cladding layer 500 shown in FIG. 3. The diffraction grating 550 facilitates optical coupling between the first and second waveguides 420 and 430 by grating assisted directional coupling. The two modes within the first and second waveguides 420 and 430 are optimized by the diffraction grating 550, thereby achieving efficient coupling between the first and second waveguides 420 and 430. In this case the mode indices of the waveguides no longer need to be matched. It is also contemplated that the recording head can include the diffraction grating in addition to the cladding layer (not shown). The diffraction grating allows for more efficient coupling between the first and second waveguides than just including the cladding layer alone, and therefore allows for a shorter interaction length L.

The first and second waveguides 420 and 430 are located adjacent to the write pole 320. As shown in FIGS. 2-4, the first waveguide 420 is located immediately adjacent the write pole 320. Alternatively, the second waveguide can be located immediately adjacent the write pole (not shown). The first and second waveguides 420 and 430 can be integrally formed with the write pole 320. This configuration allows for heating of the recording medium 130 in close proximity to where the write pole 320 applies the magnetic write field H to the recording medium 130. This configuration also provides for the ability to align the first and second waveguides 420 and 430 with the write pole 320 so as to maintain heating application on the same track of the recording medium 130 where the writing is to take place.

The recording head 160 can further include a solid immersion optical element, such as a solid immersion mirror (SIM) 437 for focusing the radiant energy transmitted by the second waveguide 430 to the heat emission surface 440 that is well known in the art. The SIM 437 may be an integrated part of the second waveguide 430. The SIM may be formed along the inner walls and at the exit of the second waveguide 430. As the radiant energy exits the second waveguide 430, the radiant energy is coupled and focused by the SIM 437. At an apex of the SIM 437, the radiant energy is focused for eventual coupling with the recording medium 130. Alternatively, the SIM can be integrated in both the first and second waveguides (not shown). Heat or thermal energy 438 is transmitted from the heat emission surface 435 for heating a localized area of the recording medium 130. In place of a SIM, other types of solid immersion optical elements such as a solid immersion lens may be used in the alternative. Solid immersion optical elements in waveguides had been disclosed in co-pending U.S. patent application Ser. No. 10/392,015, entitled "HEAT ASSISTED MAGNETIC RECORDING HEAD WITH A PLANAR WAVEGUIDE", which was filed on Mar. 19, 2003 and claims priority from U.S. Provisional Application Ser. No. 60/392,249, filed Jun. 28, 2002. Such application has been commonly assigned to the assignee of the present application, and is incorporated by reference as if fully set forth herein.

In operation, the recording medium 130 is passed under the recording head 160 in the direction indicated by the arrow 360. The radiant energy source 400 transmits radiant energy via the optical fiber 410 to the first waveguide 420. The width WI of the first waveguide 420 allows for efficient end fire coupling the radiant energy from the optical fiber 410 to the first waveguide 420. The radiant energy is then optically coupled from the first waveguide 420 to the second waveguide 430. The cladding layer 500 and/or the diffraction grating 550 facilitate the optical coupling between the first and second waveguides 420 and 430. The radiant energy in the second waveguide 430 is focused by the SIM 437 onto the heat emission surface 435. The second waveguide 430 transmits from the heat emission surface 435 thereof heat or thermal energy 440 for heating the recording medium 130. The first and second waveguides 420 and 430 together effectively and efficiently focus the spot size of the radiant energy from S1 to S2. More specifically, a localized area of the record layer 390 (e.g., spot 131, corresponding to spot size S2) is heated to lower the coercivity thereof prior to the write pole 320 applying the magnetic write field H to the spot 131. The first waveguide 420 can more efficiently couple to the input radiant energy 436 that typically has a larger spot size S1 than the output radiant energy 440 that has a significantly smaller spot size S2 suitable for high density recording. The novel waveguide configuration of the present invention allows for an HAMR head that is relatively compact and easy to manufacture, overcoming the drawbacks in the prior art.

At a downtrack location, when the medium 130 is moved to position the heated spot 131 under the write pole 320, the write pole 320 applies a magnetic write field H to the spot 131, corresponding to write data. The write field H is applied while the spot 131 remains at a sufficiently high temperature for lowering the coercivity of the recording medium 130.

The controller 191, possibly in conjunction with control signals from an external information processing system, not shown, controls the operations and synchronizations of the various components of the disc drive 100, including the radiant energy source 400, in connection with data write operations.

While the invention has been particularly shown and described with reference to the preferred embodiments, it will be understood by those skilled in the art that various changes in form and detail may be made without departing from the spirit, scope, and teaching of the invention. For example, the magnetic recording head can include more than two waveguides optically coupled to each other for end fire coupling and focusing radiant energy. In addition, the width of the first waveguide can be the same width or narrower than the width of the second waveguide depending on the requirements for the particular application. Additional components to facilitate optical coupling may be included, such as a diffraction grating for coupling the radiant energy to the first waveguide. Furthermore, the present invention may be implemented in other types of data recording transducers (e.g., optical recording transducers, magneto-resistive transducers, etc.) and/or for use with other types of data recording media in other types of data recording systems (e.g., magnetic tape drive systems, magnetic disc drive systems, optical data recording systems, etc.), without departing from the scope and spirit of the present invention. Accordingly, the disclosed invention is to be considered merely as illustrative and limited in scope only as specified in the appended claims.

What is claimed is:

1. A data recording head for use in conjunction with a data recording medium, comprising:
    a body;
    a first waveguide supported by the body; and
    a second waveguide supported by the body and energy-coupled to the first waveguide,
        wherein the first waveguide has a first side having a first a first width and the second waveguide has a second side having a second width, the first width and the second width being measured in a direction of the space between the first waveguide and the second waveguide,
        wherein the first width is larger than the second width,
        wherein the first waveguide is configured to receive a propagated radiant energy directed from a source towards the first side,
        wherein the second waveguide is adjacent to the first waveguide such that the space between the first waveguide and the second waveguide is not aligned with the propagated radiant energy from the source, and
        wherein the propagated radiant energy is propagated from the first waveguide to the second waveguide across the space between the first waveguide and second waveguide.

2. The recording head of claim 1, wherein the first waveguide is configured to end fire couple the propagated radiant energy.

3. The recording head of claim 2, wherein the propagated radiant energy corresponds to a first spot size, and the first width is sized to substantially correspond to the first spot size, and wherein the second waveguide is configured to output radiant energy from the data recording head that corresponds to a second spot size.

4. The recording head of claim 1 wherein the first waveguide corresponds to an input spot size and the second waveguide corresponds to an output spot size, wherein the input spot size is larger than the output spot size.

5. The recording head of claim 1, further comprising an index matching layer between the first and second waveguides for facilitating mode index matching between the first and second waveguides.

6. The recording head of claim 5, wherein the index matching layer comprises a cladding layer in the space between the first waveguide and the second waveguide.

7. The recording head of claim 1, wherein the second waveguide comprises a solid immersion optical element that is configured to focus radiant energy as an output.

8. A data storage system, comprising:
    a data recording medium;
    a radiant energy source;
    a data recording head, comprising:
    a body,
    a first waveguide supported by the body and coupled to receive a propagated radiant energy from the radiant energy source, and
    a second waveguide supported by the body and energy-coupled with the first waveguide, the second waveguide directing radiant energy to the data recording medium,
        wherein the first waveguide and the second waveguide are separated by a space,
        wherein the first waveguide has a first side having a first width and the second waveguide has a second side having a second width, the first width and the second width being measured in a direction of the space between the first waveguide and the second waveguide,
        wherein the first waveguide is configured to receive the propagated radiant energy directed from the radiant energy source towards the first side,
        wherein the second waveguide is adjacent to the first waveguide such that the space between the first waveguide and the second waveguide is not aligned with the propagated radiant energy from the radiant energy source;
        wherein the propagated radiant energy is propagated from the first waveguide to the second waveguide across the space between the first waveguide and second waveguide; and
    an actuator supporting and positioning the data recording head with respect to the data recording medium to effect data recording.

9. The system of claim 8, wherein the first waveguide is configured to end fire couple with the propagated radiant energy.

10. The system of claim 9, wherein the radiant energy source produces the propagated radiant energy corresponding to a first spot size, wherein the second waveguide is configured to direct output radiant energy having a second spot size, which is smaller than the first spot size.

11. The system of claim 8, wherein the data recording head further comprises at least one of a cladding layer and a diffraction grating between the first and second waveguides.

12. The system of claim 8, wherein the data recording head further comprises a solid immersion optical element that is configured to focus radiant energy onto the data recording medium.

13. The system of claim 8, wherein the data recording medium includes a magnetic data recording medium and wherein the data recording head further comprises a write element to effect magnetic data recording on the magnetic data recording medium, wherein the first and second waveguides are configured relative to the write element and the data recording head is supported and positioned by the actuator relative to the data recording medium to effect heat assisted magnetic recording.

14. A method of data recording, comprising the steps of:
providing a radiant energy source;
providing a data recording head comprising a first waveguide coupled to the radiant energy source, and a second waveguide energy-coupled to the first waveguide and configured to direct radiant energy to a data recording medium;
wherein the first waveguide and the second waveguide are separated by a space,
wherein the first waveguide has a first side having a first width and the second waveguide has a second side having a second width, the first width and the second width being measured in a direction of the space between the first waveguide and the second waveguide, and
wherein the first width is larger than the second width,
wherein the first waveguide is configured to receive a propagated radiant energy directed from the radiant energy source towards the first side, and
wherein the second waveguide is adjacent to the first waveguide such that the space between the first waveguide and the second waveguide is not aligned with the propagated radiant energy from the radiant energy source,
wherein the propagated radiant energy is propagated from the first waveguide to the second waveguide across the space between the first waveguide and second waveguide;
directing radiant energy at a spot on the data recording medium; and recording data at a spot where radiant energy has been directed.

15. The method of claim 14, wherein the radiant energy source produces the propagated radiant energy corresponding to a first spot size, wherein the second waveguide is configured to direct output radiant energy having a second spot size, which is smaller than the first spot size.

16. The recording head of claim 5, wherein the index matching layer comprises a diffraction grating in the space between the first waveguide and the second waveguide.

17. The recording head of claim 1, wherein the first waveguide comprises $SiO_x$ and the second waveguide comprises $Ta_2O_5$.

18. The recording head of claim 1, wherein the first waveguide and the second waveguide both overlap a plane that is substantially parallel to the first side and the second side, wherein the plane is substantially perpendicular to a plane in the direction of the propagated radiant energy.

19. The recording head of claim 1, wherein the first waveguide and the second waveguide overlap each other by an interactive length, wherein the interactive length is less than an entire length of either the first waveguide or the second waveguide.

* * * * *